Figure 1:
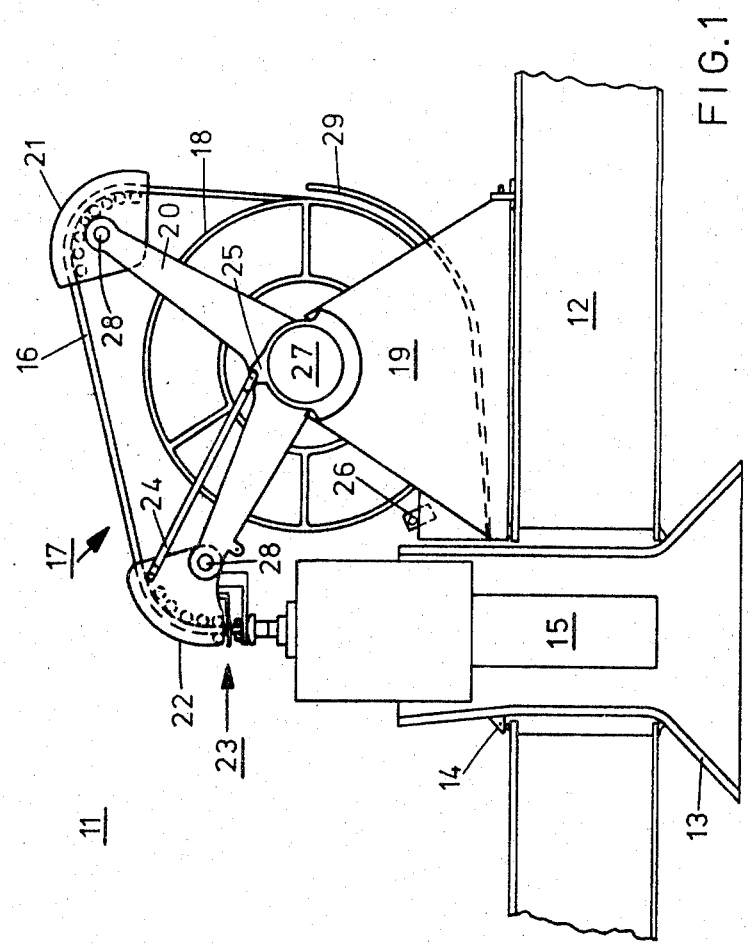

United States Patent [19]
Mills et al.

[11] 3,804,371
[45] Apr. 16, 1974

[54] WINCH MECHANISMS

[75] Inventors: Noel Mills; Geoffrey Peter Warley, both of Yeovil, England

[73] Assignee: Westland Aircraft Limited, Yeovil, England

[22] Filed: Mar. 6, 1972

[21] Appl. No.: 232,177

[30] Foreign Application Priority Data
Mar. 4, 1971 Great Britain...................... 5986/71

[52] U.S. Cl. ........................ 254/186 R, 254/190 R
[51] Int. Cl. ............................................ B66d 1/38
[58] Field of Search .......... 254/150, 186, 190, 173, 254/134.3 CC, 186 R, 190 R; 242/157, 45, 54

[56] References Cited
FOREIGN PATENTS OR APPLICATIONS
1,359,904  12/1964  France................................ 254/186

*Primary Examiner*—Evon C. Blunk
*Assistant Examiner*—James W. Miller
*Attorney, Agent, or Firm*—Larson, Taylor & Hinds

[57] ABSTRACT

A winch mechanism is provided for installation in areas having a limited vertical dimension, and is of particular benefit in one application for installation in a helicopter cabin to control movement of a load through a hole in the cabin floor. The mechanism includes a suspension means which is automatically moved between upper and lower positions during raising and lowering of the load. In one embodiment this movement is accomplished in association with a moving shroud assembly which combines with a fixed shroud to encase the mechanism when the load is in a lowered position.

10 Claims, 4 Drawing Figures

WINCH MECHANISMS

This invention relates to winch mechanisms, and more particularly to such mechanisms for installation in a helicopter for raising and lowering a load through an aperture in the floor of the fuselage.

In one particular role helicopters are used to carry sonar equipment which, during operation, necessitates the lowering of a sonar body into the sea. The sonar body is lowered by a winch through an aperture in the fuselage. The supporting cable is used to provide signals to an aircraft autopilot to ensure that the body is maintained upright in the water. It is necessary to provide for a cable swing of up to 15° around the center position, and to permit this to be obtained within the structural constraints of the helicopter, it has been necessary to provide a vertically movable travelling head containing the cable angle sensors, the travelling head moving on tracks secured in the aircraft fuselage. Since the travelling head becomes the datum point about which the cable deflects it is of necessity strong and thus heavy. A further disadvantage of this system stems from the necessity of stowing the body within the cabin, which means that the headroom in the cabin must be sufficient to accommodate the overall height of the body plus the vertically movable travelling head. This has meant that the smaller helicopter has been precluded from consideration for this type of operation simply because of insufficient headroom in the cabin.

According to the invention we provide a winch mechanism for raising and lowering a load through an aperture, wherein, during initial lowering of the load from a raised stowed position, a suspension means is automatically moved in a substantially vertical direction from an upper stowed position to a lower operational position, and during final stages of raising the load the suspension means is automatically restored to the upper stowed position.

Figure 2:
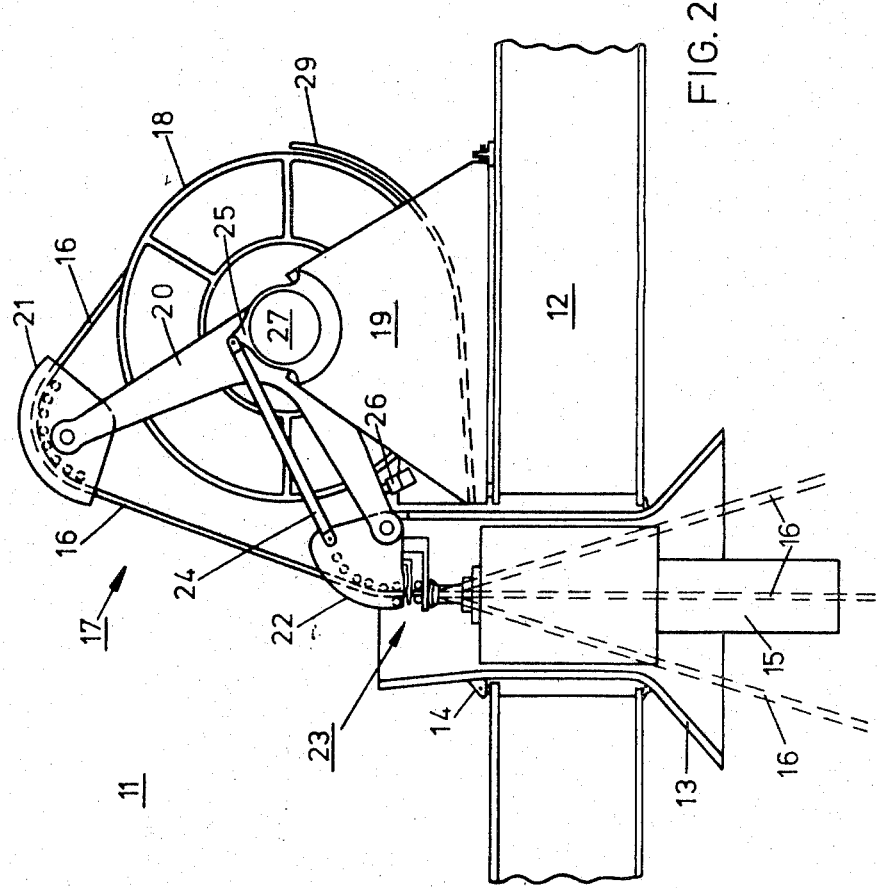
Figure 3:
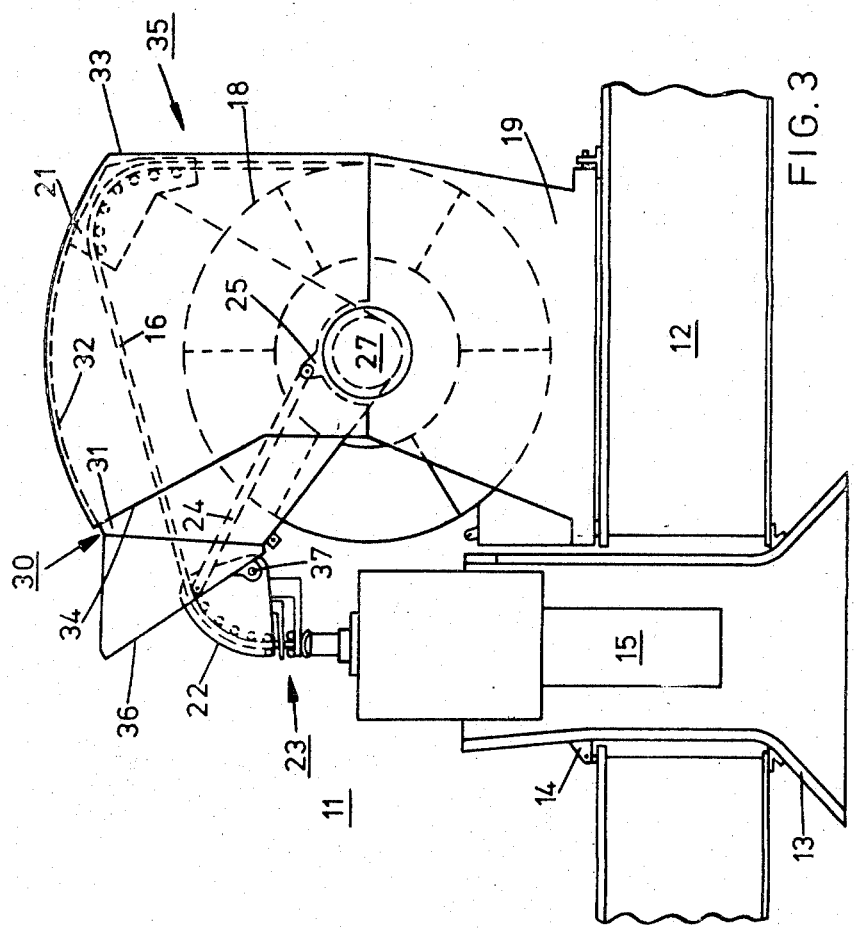
Figure 4:
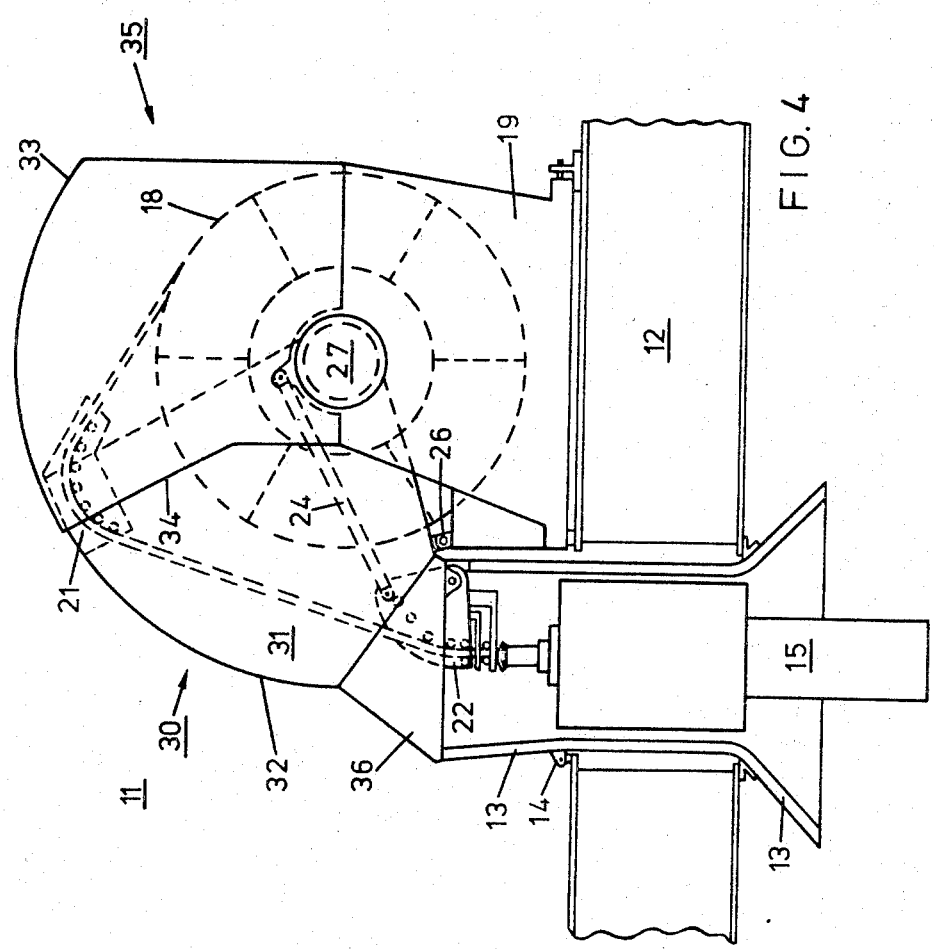

The invention will now be described by way of example only and with reference to the accompanying drawings, in which:

FIG. 1 is a part sectional side elevation of one embodiment of the invention showing a sonar body in a raised position, FIG. 2 is a part sectional side elevation of the embodiment of FIG. 1 with the sonar body in a lowered position, FIG. 3 is a part sectional side elevation of a second embodiment of the invention showing a sonar body in a raised position, and FIG. 4 is a part sectional side elevation of the embodiment of FIG. 3 with the sonar body in a lowered position.

A helicopter cabin 11 has a floor 12. A circular section funnel assembly 13 is fitted in an aperture in the floor 12 and is secured to the floor at 14.

Referring now to FIGS. 1 and 2, the funnel assembly 13 has a flared lower end and acts as a guide for a sonar body 15 which is shown in a raised stowed position in FIG. 1. The body 15 is supported by a cable 16, which is guided over a travelling head beam assembly, generally indicated at 17 and hereinafter fully described, and wound onto a cable drum 18. Each end of the cable drum 18 is located in bearings carried by rigid frames 19 attached to fixed fittings on the floor 12 by bolts and spigots. The drum is rotated about an axis 27 by a motor located within the central hub of the drum (not shown).

In the drawings the travelling head beam assembly 17 is shown in the raised stowed position in FIG. 1 and in the lowered operational position in FIG. 2. The assembly consists of a pair of beams 20 located one at each end of the cable drum 18. Each beam comprises a hub arranged for free rotation about the axis 27 independent of rotation of the drum, and two arms extending radially from the hub at substantially 90° spacing. The arms of the beams 20 are joined by cross members 28, the beams being restrained for movement through an arc so that one of the cross members is located above the funnel in both a raised and a lowered position. The cross member located above the funnel carries a travelling head assembly 22 and the second cross member carries a roller assembly and cable layering device 21. The travelling head assembly 22 is pivotally mounted, and incorporates cable guide rollers, cable angle sensors and a cable cutting device, the sensors and cutter being generally indicated at 23. The head 22 is pivotally joined by a fixed length lever 24 to a fixed bracket 25. A locking device 26 is provided on the lower arms of the beams 20 to automatically lock the beams 20, and therefore the head 22, to a projection on the frames 19, when in the lower operating position. A drip tray 29 is located beneath the cable drum 18 and is shaped to direct water out through the aperture in the floor 12.

With the sonar body 15 in its stowed position (FIG. 1), initial counterclockwise rotation of the cable drum 18 is effective to lower the body 15 to the position shown in FIG. 2, which automatically rotates the beams 20 so that the travelling head assembly 22 moves to its lowered operational position, also shown in FIG. 2. The beams 20 are automatically locked in this position by engagement of the locking device 26. During movement, the head 22 is maintained in correct angular orientation with the cable 16 and the body 15 by the fixed length lever 24, which causes the head 22 to rotate about the cross member 28 during rotation of the beams 20.

Further counterclockwise rotation of the drum 18 lowers the body 15 through the funnel 13 to be immersed in the water in its operational position. It is clear from the drawing that, by lowering the suspension means, which comprises the travelling head assembly 22, the necessary 15° maximum cable angle about the centre position is obtainable with a much smaller fuselage aperture than would otherwise be possible.

Variations in cable angle are sensed by the angle sensors incorporated in the head 22, and result in signals to an aircraft autopilot, which repositions the aircraft so that the body 15 is maintained in an upright position in the water. The cable cutter, also incorporated in the head 22, can be operated to sever the cable 16 and release the body in an emergency.

When it is required to raise the body 15 the cable drum 18 is rotated clockwise to wind on the cable 16, this operation being facilitated by the cable layering device 21. The body is guided by the lower flared end of the funnel 13, into the position shown in FIG. 2 in which a projection on the top of the body 15 abuts a surface of the travelling head assembly 22. Further rotation of the drum 18 is effective to overcome the locking device 26 and automatically rotate the beams 20 about the axis 27 and raise the body to its stowed position shown in FIG. 1. The motor driving the drum 18 can be controlled manually and/or automatically, to prevent further rotation of the arms 20.

The embodiment of the invention shown in FIGS. 3 and 4 incorporates means to prevent splashing of salt water in the cabin when the sonar body is being raised. The same reference numerals are used to designate similar parts and the following description is restricted to the arrangement peculiar to the embodiment of FIGS. 3 and 4.

In this embodiment the roller assembly and cable layering device 21 and the travelling head assembly 22 comprising the load suspension means are mounted on a moving shroud assembly 30. The assembly 30 comprises two end pieces 31 generally in the shape of a segment of a circle located one at each end of the cable drum 18 for free rotational movement about the axis 27, independent of rotation of the drum, the end pieces being joined by a shroud 32 secured around the radiused edges. A fixed shroud 33 encompasses the moving shroud 30 and has an open side 34 facing the funnel 13 located in the aperture in the floor 12 and a closed side 35 remote from the funnel. The fixed shroud 33 is supported by end plates secured to the rigid frame 19 at each end of the cable drum 18 and has a radiused inner surface conforming to the radiused outer surface of the moving shroud assembly 30. Rotation about the axis 27 results in telescopic movement of the moving shroud assembly 30 through the open end 34 of the fixed shroud 33 between a raised position shown in FIG. 3 and a lowered position shown in FIG. 4.

A cover 36 is fitted along one edge of the moving shroud assembly 30 and shaped to conform to the upper surface of the funnel 13. The cover 36 is located so that when in the lowered position it locates over the funnel 13 to effectively close off the aperture, as shown in FIG. 4.

The travelling head assembly 22 is pivotally mounted at 37 in the cover 36 and includes cable guide rollers, cable angle sensors and a cable cutting device generally indicated at 23 and identical with the arrangement previously described. The head 22 is similarly joined by a fixed length lever 24 to a fixed bracket 25, and the sonar body 15 is again supported by a cable 16 extending over the travelling head assembly 22 and the cable layering device 21, the cable being wound onto a cable drum 18 driven in the same manner to that previously described. Locking means 26 is effective to lock the moving shroud assembly 30 in the lowered position, as shown in FIG. 4. A drip tray can be fitted beneath the cable drum 18, as described in relation to the embodiment shown in FIGS. 1 and 2.

Operation of the embodiment of the invention shown in FIGS. 3 and 4 is similar to that previously described. Initial counterclockwise rotation of the cable drum 18 with the sonar body 15 in its raised stowed position as shown in FIG. 3 is effective to unwind the cable 16 and lower the sonar body 15 to the position shown in FIG. 4, which causes automatic rotation of the moving shroud assembly 30 about the axis 27 to the position shown in FIG. 4 in which it is locked by the locking means 26. This initial movement is effective to lower the suspension means in the form of the travelling head assembly 22, to give the same advantages as in the previous embodiment.

When in the lowered position the cover 36 locates over the top end of the aperture through the funnel 13 and acts with the moving shroud assembly 30 and the fixed shroud 33 to completely encase the winch mechanism. This is effective to prevent any splashing of water in the cabin 11 during raising of the sonar body 15 to the position shown in FIG. 4, in which a projection on the top of the body 15 abuts a surface of the travelling head assembly. Further clockwise rotation of the drum 18 causes automatic rotation of the moving shroud assembly 30 about the pivot 27 to raise the travelling head assembly 22 and the sonar body 15 to the position shown in FIG. 3. It will be seen that in the raised position the travelling head assembly 22 is maintained well clear of the cover 36 to facilitate servicing.

In both the embodiments previously described it will be seen that in the stowed position the sonar body 15 is housed entirely within the cabin 11, which means that there is no drag penalty during flight and that extra ground clearance does not have to be provided for landing.

From the foregoing it will be clear that the present invention provides a winch arrangement having particular benefits for a helicopter sonar installation which incorporates automatic raising and lowering of the suspension means, which causes no increase in the vertical height of the installation. The assembly is, therefore, compact, relatively light in weight, and incorporates a minimum of parts which improves the reliability. Also, as no other fixing than through the frames 19 is necessary, the removal of the entire sonar installation is much simplified, so that full utilisation of machines in other roles is possible.

Although one embodiment has been described and illustrated, it is to be understood that modifications can be made which are within the scope of the invention. For instance, the beams 20 or the moving shroud 30 may be arranged to pivot about an axis other than the axis of the drum 18. The locking device 26 may be of any suitable automatically releasable type, and the drum motor may be operated either electrically, hydraulically, or pneumatically, although in the specific application hereinbefore described a hydraulic motor is preferred.

We claim as our invention:

1. In a winch mechanism for raising and lowering a load through an aperture in a floor, the winch mechanism comprising a cable wound on a cable drum supported from the floor adjacent the aperture for rotation about a horizontal axis of the drum, the load being suspended from said cable, the improvement comprising a structure mounted for free rotation on said horizontal axis independent of the drum, a cable layering device and a load suspension means carried separately by said structure, said cable being located over said cable layering device and said load suspension means, said structure being restrained for limited rotation on said horizontal axis so that the suspension means is located above and generally central of the aperture in both a raised and lowered position.

2. A winch mechanism as claimed in claim 1, wherein said structure has at each end of said drum, a hub and two arms extending radially from the hub at about 90° spacing, the corresponding arms at each end of the drum being joined by cross members, one of said cross members supporting said load suspension means and the other of said cross members supporting said cable layering device.

3. A winch mechanism as claimed in claim 1, wherein said structure comprises a moving shroud assembly having an end piece generally in the shape of a segment of a circle located at each end of said drum, said end pieces being joined by a shroud secured around their radiused edges, said load suspension means being secured on one edge of said moving shroud assembly and the cable layering device being secured along the other edge, a fixed shroud assembly having an open side facing the aperture and a closed side remote therefrom, said moving shroud assembly being arranged in telescopic engagement with said fixed shroud assembly, so that when said load suspension means is in its lowered position the moving shroud assembly and the fixed shroud assembly combine to encase the winch mechanism.

4. A winch mechanism as claimed in claim 1 wherein said load suspension means includes cable guide rollers, cable angle sensors and a cable cutting device.

5. A winch mechanism as claimed in claim 4 wherein said load suspension means is pivotally mounted on said structure.

6. A winch mechanism as claimed in claim 5 further comprising a fixed length lever pivotally mounted at one end to said load suspension means and at the opposite end to a fixed structure to ensure correct angular orientation of the load suspension means during movement between its raised and lowered positions.

7. A winch mechanism as claimed in claim 1 further comprising locking means for locking the rotatable structure in its lowered position.

8. A winch mechanism as claimed in claim 1 further comprising a drip tray located beneath said cable drum and sloped toward the aperture in the floor structure.

9. A winch mechanism as claimed in claim 1 wherein said cable drum is rotated by a motor located in a substantially hollow hub.

10. A winch mechanism as claimed in claim 9 wherein said motor is hydraulically operated.

* * * * *